(12) United States Patent
Hamdi

(10) Patent No.: US 12,182,173 B2
(45) Date of Patent: Dec. 31, 2024

(54) SYSTEMS AND METHODS FOR DATA ABSTRACTION FOR TRANSMISSION

(71) Applicant: Acentium Inc, Boston, MA (US)

(72) Inventor: Amine Hamdi, Boston, MA (US)

(73) Assignee: Acentium Inc, Boston, MA (US)

( * ) Notice: Subject to any disclaimer, the term of this patent is extended or adjusted under 35 U.S.C. 154(b) by 0 days.

(21) Appl. No.: 18/086,241

(22) Filed: Dec. 21, 2022

(65) Prior Publication Data
US 2023/0195757 A1 Jun. 22, 2023

Related U.S. Application Data

(60) Provisional application No. 63/292,990, filed on Dec. 22, 2021.

(51) Int. Cl.
*G06F 16/28* (2019.01)
*G06F 16/901* (2019.01)

(52) U.S. Cl.
CPC .................. *G06F 16/285* (2019.01)

(58) Field of Classification Search
None
See application file for complete search history.

(56) References Cited

U.S. PATENT DOCUMENTS

| 7,917,552 | B2 | 3/2011 | Mills | |
| 10,755,171 | B1* | 8/2020 | Sharifi | ...................... G06N 3/08 |
| 2006/0101196 | A1* | 5/2006 | Urmston | ........... G06F 16/90339 |
| | | | | 711/108 |
| 2018/0232387 | A1* | 8/2018 | Boutnaru | ................ H04L 67/34 |
| 2022/0207885 | A1* | 6/2022 | Ansari | ...................... H04L 9/14 |
| 2022/0284029 | A1* | 9/2022 | Lal | ......................... G06F 16/14 |

OTHER PUBLICATIONS

International Search Report and Written Opinion on PCT Appl. Ser. No. PCT/US2022/053691 dated May 4, 2023 (11 pages).
Novell, "Novell DirXML Administration Guide," retrieved from http://www.directory-info.com/DirXML/dirxmlAdmin.pdf on Nov. 24, 2004, XP002309371, 224 pages.
International Preliminary Report on Patentability on PCT International Patent Application No. PCT/US2022/053691 dated Jul. 4, 2024 (7 pages).

* cited by examiner

*Primary Examiner* — Kamal M Hossain
(74) *Attorney, Agent, or Firm* — Foley & Lardner LLP

(57) ABSTRACT

Systems and methods for data abstraction can include a data abstraction system assigning to each data item of a plurality of data items a corresponding arbitrary identifier, and maintaining a mapping between each data item of the plurality of data items and the corresponding arbitrary identifier. The data abstraction system can determine information associated with a first data item of the plurality of data items for transmission to a computing device. The data abstraction system can identify, using the mapping, a first arbitrary identifier assigned to the first data item, and transmit the information with the first arbitrary identifier to the computing device.

20 Claims, 6 Drawing Sheets

SYSTEMS AND METHODS FOR DATA ABSTRACTION FOR TRANSMISSION

CROSS-REFERENCE TO RELATED APPLICATIONS

This application claims priority to, and the benefit of, U.S. Provisional Application No. 63/292,990 filed on Dec. 22, 2021, and entitled "SYSTEMS AND METHODS FOR DATA ABSTRACTION FOR TRANSMISSION," the content of which is incorporated herein by reference in its entirety.

FIELD OF THE DISCLOSURE

The present application relates generally to systems and methods for data abstraction. Specifically, the present application relates to systems and methods for applying data abstraction to data items for use in data transmission.

SUMMARY OF THE DISCLOSURE

According to at least one aspect, a system can include one or more processors and a memory storing computer executable instructions. The computer executable instructions, when executed by the one or more processors, can cause the one or more processors to assign to each data item of a plurality of data items a corresponding arbitrary identifier. The corresponding arbitrary identifier can be different from a system identifier assigned to the data item by a computer network maintaining the data item. The one or more processors can maintain a mapping between each data item of the plurality of data items and the corresponding arbitrary identifier, and determine information associated with a first data item of the plurality of data items for transmission to a computing device. The one or more processors can identify, using the mapping, a first arbitrary identifier assigned to the first data item, and transmit the information with the first arbitrary identifier to the computing device.

In some implementations, in maintaining the mapping between each data item of the plurality of data items and the corresponding arbitrary identifier, the one or more processors can map the corresponding arbitrary identifier to the system identifier of the data item. In some implementations, the one or more processors can identify a group of related data items, assign an arbitrary group identifier to the group of related data items, and maintain a mapping between the arbitrary group identifier and the group of related data items. The one or more processors can map the arbitrary group identifier to arbitrary identifiers of data items in the group of related data items. The one or more processors can determine second information associated with the group of data items for transmission to the computing device, identify, using the mapping, a first arbitrary group identifier assigned to the group of related data items, and transmit the second information with the first arbitrary group identifier to the computing device. The group of data items can include at least one of a set of data items associated with a project, a set of data items associated with a customer, a set of data items associated with an asset of the computer network, or a set of data items associated with a category of assets of the computer network.

In some implementations, the plurality of data items can include at least one of a data file, a data parameter, a graphical object, a table, or a data structure. In some implementations, the plurality of data items can be associated with a workspace accessed by the computing device.

In some implementations, the one or more processors can receive a request for the information associated with the first data item from the computing device, and determine the information associated with the first data item responsive to the request. In some implementations, the one or more processors can update arbitrary identifiers assigned to the plurality of data items on a regular basis.

According to at least one aspect, a method can include one or more processors assigning, to each data item of a plurality of data items a corresponding arbitrary identifier. The corresponding arbitrary identifier can be different from a system identifier assigned to the data item by a computer network maintaining the data item. The method can include the one or more processors maintaining a mapping between each data item of the plurality of data items and the corresponding arbitrary identifier, and determining information associated with a first data item of the plurality of data items for transmission to a computing device. The method can include the one or more processors identifying, using the mapping, a first arbitrary identifier assigned to the first data item, and transmitting the information with the first arbitrary identifier to the computing device.

In some implementations, maintaining the mapping between each data item of the plurality of data items and the corresponding arbitrary identifier can include mapping the corresponding arbitrary identifier to the system identifier of the data item. In some implementations, the method can include the one or more processors identifying a group of related data items, assigning an arbitrary group identifier to the group of related data items, and maintaining a mapping between the arbitrary group identifier and the group of related data items. The method can include the one or more processors mapping the arbitrary group identifier to arbitrary identifiers of data items in the group of related data items. The method can include the one or more processors determining second information associated with the group of data items for transmission to the computing device, identifying, using the mapping, a first arbitrary group identifier assigned to the group of related data items, and transmitting the second information with the first arbitrary group identifier to the computing device. The group of data items can include at least one of a set of data items associated with a project, a set of data items associated with a customer, a set of data items associated with an asset of the computer network or a set of data items associated with a category of assets of the computer network.

In some implementations, the plurality of data items can include at least one of a data file, a data parameter, a graphical object, a table, or a data structure. In some implementations, the plurality of data items can be associated with a workspace accessed by the computing device.

In some implementations, the method can include the one or more processors updating arbitrary identifiers assigned to the plurality of data items on a regular basis. In some implementations, the method can include the one or more processors updating arbitrary identifiers assigned to the plurality of data items on a regular basis.

According to at least one aspect, a computer-readable medium can include computer code instructions stored thereon. The computer code instructions when executed by one or more processors can cause the one or more processors to assign to each data item of a plurality of data items a corresponding arbitrary identifier. The corresponding arbitrary identifier can be different from a system identifier assigned to the data item by a computer network maintaining the data item. The one or more processors can maintain a mapping between each data item of the plurality of data items and the corresponding arbitrary identifier, and determine information associated with a first data item of the plurality of data items for transmission to a computing device. The one or more processors can identify, using the mapping, a first arbitrary identifier assigned to the first data item, and transmit the information with the first arbitrary identifier to the computing device.

In some implementations, in maintaining the mapping between each data item of the plurality of data items and the corresponding arbitrary identifier, the one or more processors can map the corresponding arbitrary identifier to the system identifier of the data item. In some implementations, the one or more processors can identify a group of related data items, assign an arbitrary group identifier to the group of related data items, and maintain a mapping between the arbitrary group identifier and the group of related data items. The one or more processors can map the arbitrary group identifier to arbitrary identifiers of data items in the group of related data items. The one or more processors can determine second information associated with the group of data items for transmission to the computing device, identify, using the mapping, a first arbitrary group identifier assigned to the group of related data items, and transmit the second information with the first arbitrary group identifier to the computing device. The group of data items can include at least one of a set of data items associated with a project, a set of data items associated with a customer, a set of data items associated with an asset of the computer network, or a set of data items associated with a category of assets of the computer network.

In some implementations, the plurality of data items can include at least one of a data file, a data parameter, a graphical object, a table, or a data structure. In some implementations, the plurality of data items can be associated with a workspace accessed by the computing device.

In some implementations, the one or more processors can receive a request for the information associated with the first data item from the computing device, and determine the information associated with the first data item responsive to the request. In some implementations, the one or more processors can update arbitrary identifiers assigned to the plurality of data items on a regular basis.

DETAILED DESCRIPTION

For purposes of reading the description of the various embodiments below, the following descriptions of the sections of the specification and their respective contents may be helpful:

Section A describes a computing and network environment, which may be useful for practicing embodiments described herein.

Section B describes systems and methods for data abstraction.

A. Computing and Network Environment

Figure 1A:
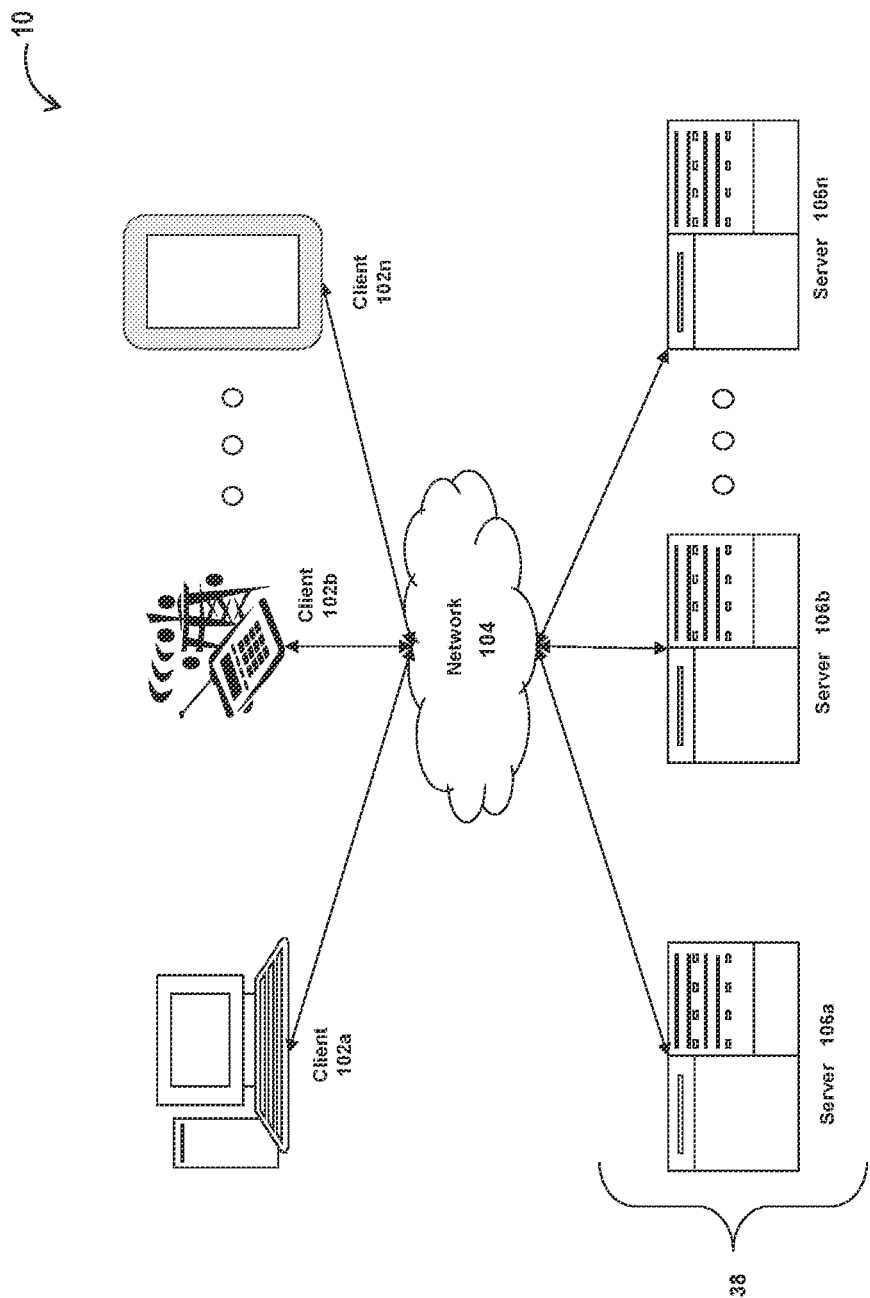
FIG. 1A is a block diagram depicting an embodiment of a network environment comprising local devices in communication with remote devices.

In addition to discussing specific embodiments of the present solution, it may be helpful to describe aspects of the operating environment as well as associated system components (e.g., hardware elements) in connection with the methods and systems described herein. Referring to FIG. 1A, an embodiment of a computing and network environment 10 is depicted. In brief overview, the computing and network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 1G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the computing and network environment 10 may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS 8 or 10, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, firewall, Internet of Things (IoT) controller. In one embodiment, the server 106 may be referred to as a remote machine or a node. In another embodiment, a plurality of nodes 290 may be in the path between any two communicating servers.

Figure 1B:
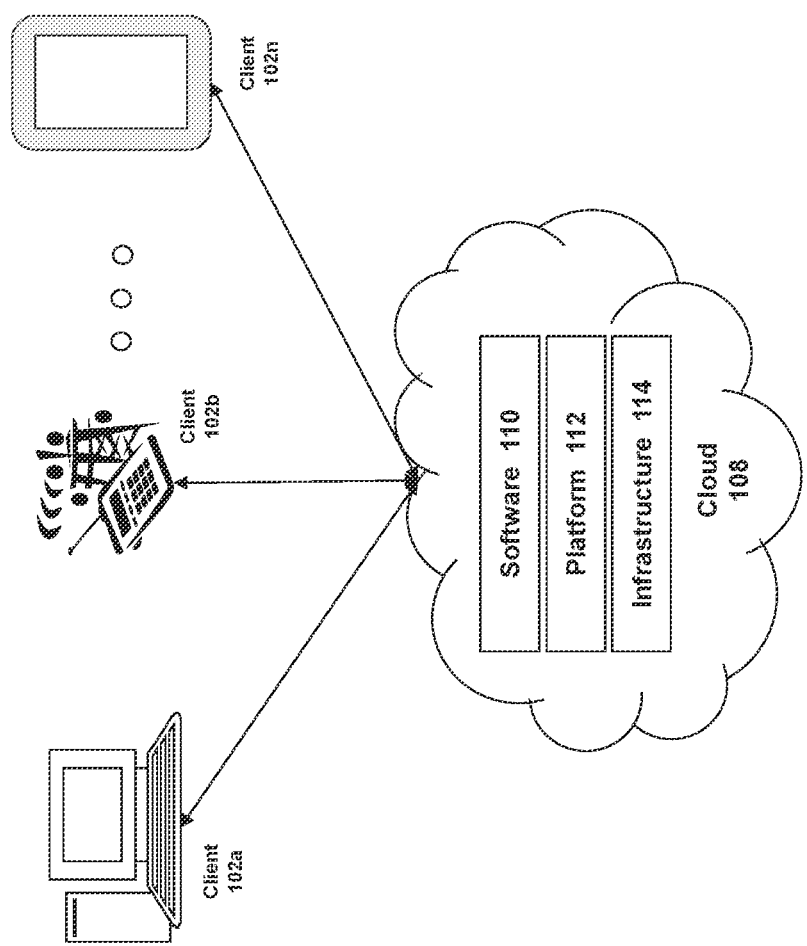
FIGS. 1B-1D are block diagrams depicting embodiments of computers useful in connection with the methods and systems described herein.

Referring to FIG. 1B, a cloud computing environment is depicted. The cloud computing environment can be part of the computing and network environment 10. A cloud computing environment may provide client 102 with one or more resources provided by the computing and network environment 10. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, for example, Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
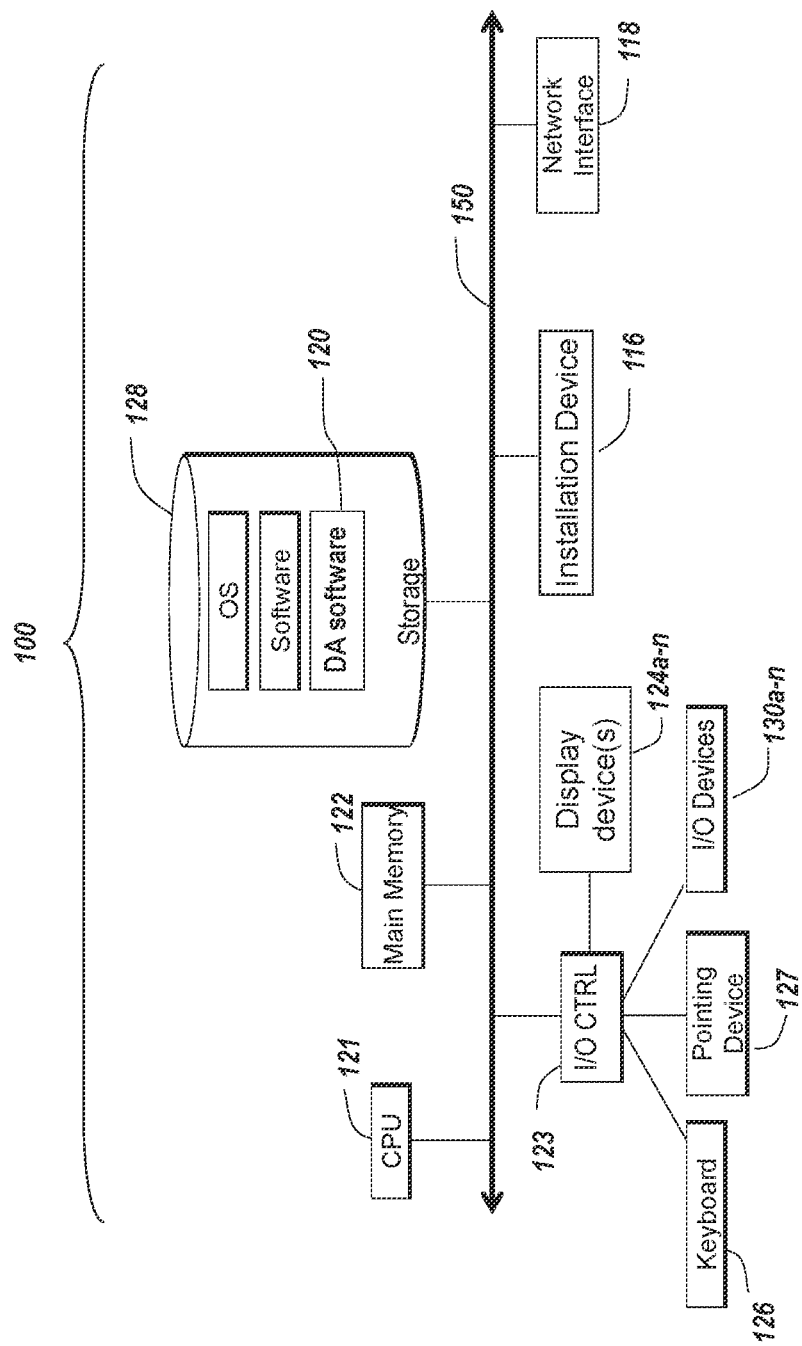
Figure 1D:
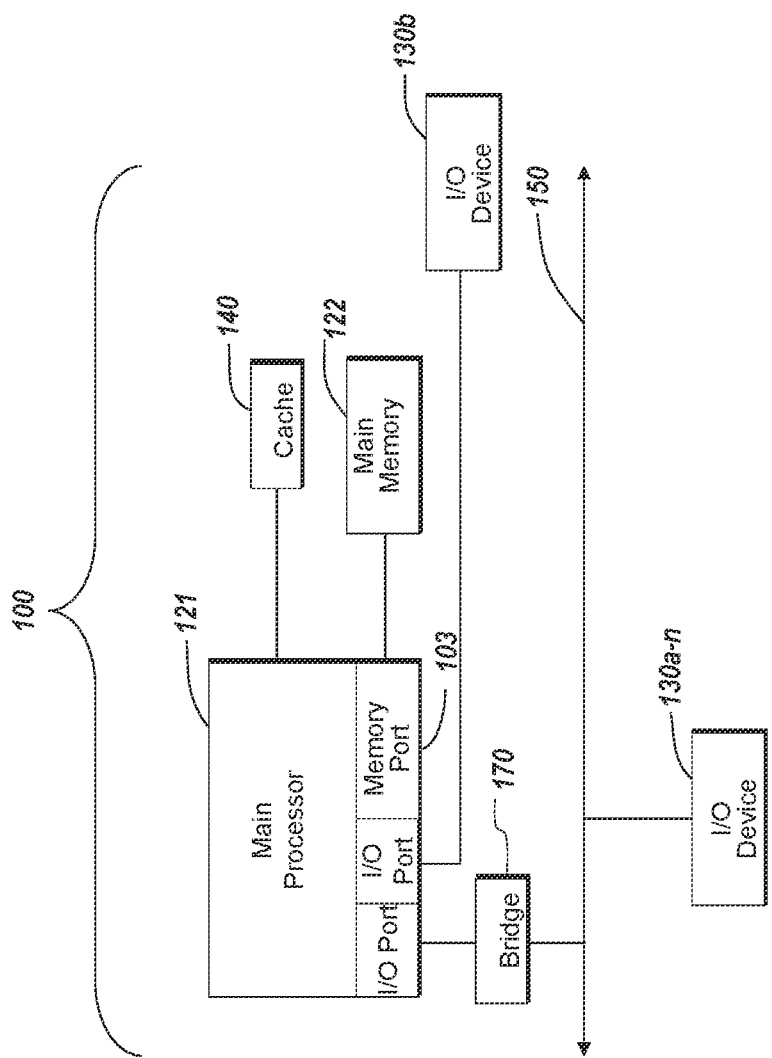

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, data abstraction (DA) software 120, and/or other software, among others. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the DA software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/ AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington. In other embodiments, the computing device 100 is a eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, central processing unit (CPU) and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Data Abstraction

In computer environments, such as enterprise networks, cloud systems, banking systems, electric utility systems or medical device networks, among others, security of the data is very important to guarantee proper operation of the computer environment. Specifically, a breach of the security of the data can result in jeopardizing sensitive data and/or putting the whole computer environment or a portion thereof out of operation. When data is transmitted from one entity to another or from one system to another, there is a risk that the data may be exposed to unauthorized access. For instance, a man-in-the-middle can intercept the communication between the two entities to get access to the transmitted data. While data may be transmitted over secure channels, data transmitted over secure connections may be intercepted and illicitly copied in encrypted form for decryption at a later time. In other words, secure connections do not totally eliminate the risk of unauthorized access to the data.

Besides man-in-the-middle attacks, the security of data transferred between different entities or systems can be compromised if the receiving end is hacked. In particular, the receiving device usually decrypts the data once received. As such, a hacker who manages to access the receiving device will easily get access to the data received by the receiving device, and may even be able to request or access additional data from the transmitting device or system. As such, using secure channels to transfer data between different entities does not help in securing the data once decrypted at the receiving device.

The above described technical problems call for novel ways for securing data either during transfer between different devices or systems, or after the data is successfully transferred. Systems and methods described herein provide reliable and efficient solutions to these technical problems. Specifically, the systems and methods described herein apply abstraction to data transferred or released, from example, from a backend to other computing devices. The data abstraction takes away any meaningful context from the data making it extremely difficult, if not impossible, for any unauthorized intruder or hacker to understand or make sense of intercepted or accessed data.

The present disclosure relates to systems and methods for data abstraction for transmission. The systems and methods described herein include assigning arbitrary identifiers to various data items. When transferring data associated with a data item, a transmitting entity, e.g., a backend server, can transmit information (e.g., attributes and/or values) associated with the data item together with the arbitrary identifier of the data item. For example, the backend server can transmit values or attributes associated with a parameter, a data structure (e.g., a table) and/or a data file together with the arbitrary identifier of the parameter, the data structure and/or the data file. Even if the transferred data were to be compromised, an unauthorized person or entity accessing the data may be able to view the values and/or attributes but would not be able to understand what the values and/or attributes correspond to. In particular, the unauthorized person or entity would not be able determine what do the values and/or attributes represent or correspond to.

Figure 2:
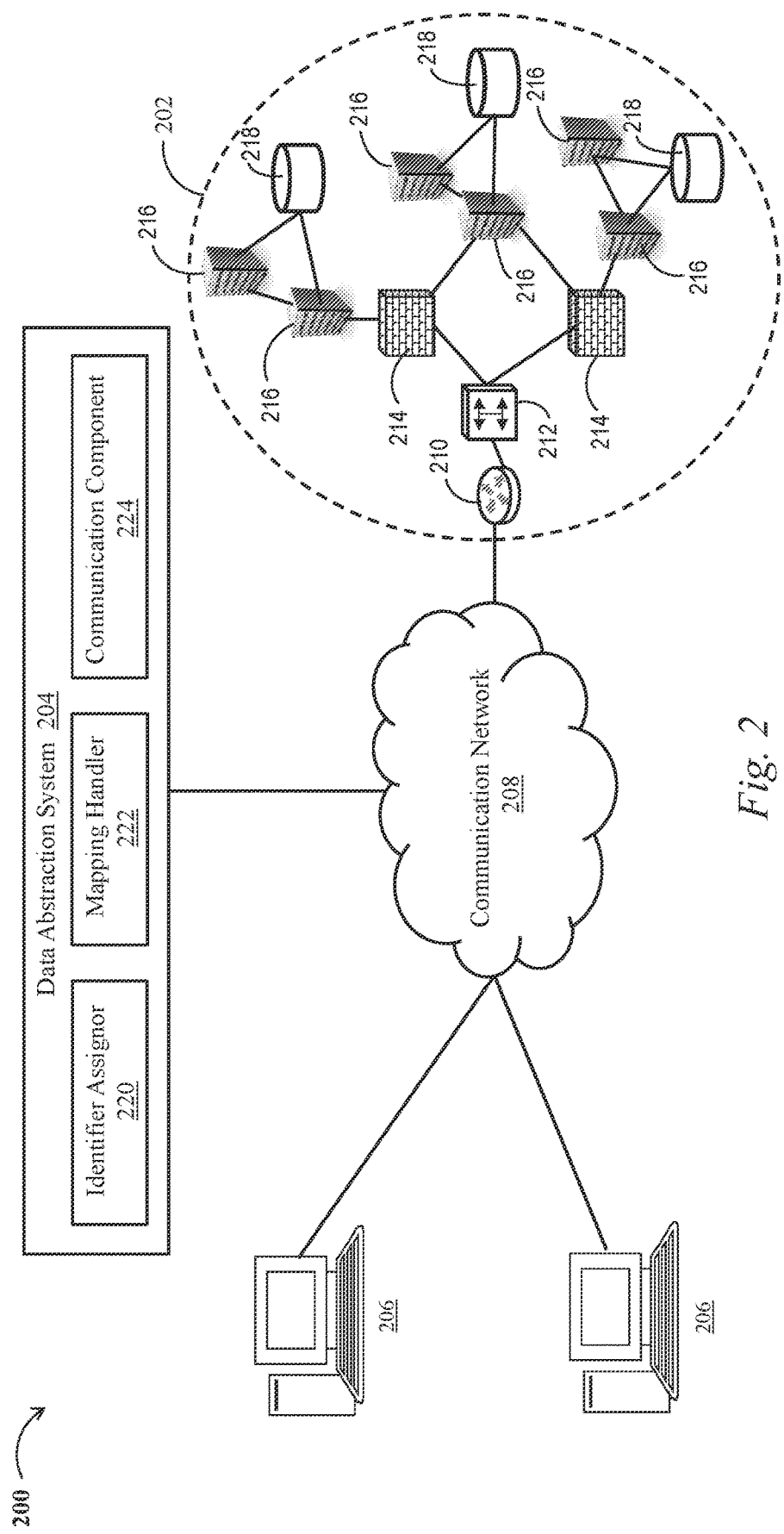
FIG. 2 shows a block diagram of an example computer environment employing data abstraction for transmission is shown, according to example embodiments.

Referring now to FIG. 2, a block diagram of an example computer environment 200 employing data abstraction for transmission is shown, according to example embodiments. The computer environment 200 can include a computer network 202, a data abstraction system 204 and one or more client devices 206. The computer network 202, the data abstraction system 204 and the client device(s) 206 can be communicatively coupled to each other via a communication network 208. For instance, the client devices 206 can communicate with computing devices of the computer network 202 and/or the data abstraction system 204 via the communication network 208. Also, the computer network 202 and the data abstraction system 204 can communicate via the communication network 208. The communications network 208 can include a local-area network (LAN), a metropolitan area network (MAN), a wide area network (WAN), a wireless network, a private network, a public network, the Internet, or a combination thereof.

The computer network 202 can be, or can include, an enterprise or corporate computer network, a power grid system, a network of remotely monitored or controlled medical devices, a cloud system, or a combination thereof, among others. The computer network 202 can include a plurality of interconnected electronic devices. The computer network 202 can include network devices, such as one or more routers 210 and/or one or more switches 212. The computer network 202 can include one or more firewalls 214 for enforcing data security rules. The computer network 202 can include a plurality of computer servers 216 and/or one or more databases 218. In general, the computer network 202 can include electronic devices, electromechanical devices, data storage devices, communication devices, medical devices or a combination thereof, among others. The computer network 202 can reside in a single geolocation or can be distributed over multiple geolocations. In some implementations, the computer network 202 can reside, at least partially, within a cloud system.

The client devices 206 can be similar to the client devices 102 discussed above with regard to FIGS. 1A and 1B. A client device 206 can remotely access the computer network 202 or resources thereof via the communication network 208. For instance, the client device 206 can initiate a communication session with a computer server 216 and/or a database 218 of the computer network 202 to access data maintained thereby. In some implementations, the client device 206 can create and access a workspace based on data maintained by the computer network 202. Data of the created workspace can be maintained by a computing device, such as a computer server 216, or a database 218 of the computer network 202.

The data abstraction system 204 can include one or more computing devices, such as computer servers, desktops, laptops and/or storage devices, among others. The data abstraction system 204 can handle data abstraction, for example, in relation with communications between the client devices 206 and computing devices of the computer network 202. The data abstraction system 204 can be implemented within the computer network 202 or as a separate system that is communicatively coupled to the computer network 202. In some implementations, the data abstraction system 204 can be implemented as a service that is configured to handle data abstraction for a plurality of computer networks. In some implementations, the data abstraction system 204 can be implemented as an appliance (e.g., one or more computing devices) intermediate between the computer network 202 and the client devices 206.

The data abstraction system 204 can include an arbitrary identifier assignor 220, a mapping handler 222 and a communication component 224. Each of these components can be implemented as software, firmware, hardware or a combination thereof. For instance, each of these components can be implemented as executable instructions that can be executed by computing devices of the data abstraction system 204 or processors thereof to perform respective functions or processes. The functions performed by the arbitrary identifier assignor 220, the mapping handler 222 and the communication component 224, allow for applying abstraction to data communicated between computing devices of the computer network 202 and remote computing devices, such as the client devices 206.

The arbitrary identifier assignor 220 can be configured to assign arbitrary identifiers (IDs) to data items of the computer network 202. As used herein, a data item can include a parameter, a string, a data structure (e.g., a table, a linked list, an array, a tree or a graph, among others), a data file, a graphical object or a combination thereof, among others. For instance, a data item can include a string indicative of a customer name, a project name or date, among others. A data item can include a parameter that may be associated with a value or an array of values. A data item can be or can include a graph associated with one or more parameters and having one or more attributes (e.g., colors, values or a combination thereof). In general, a data item can be or can include a chunk of data maintained by the computer network 202 or a storage device thereof.

The computer network 202 or storage systems thereof can assign a system identifier to each data item of a plurality of, or all, data items maintained by the computer network 202. For instance, the databases 218 and/or the computer servers 216 can assign to each data item (or to a given data item) a corresponding system identifier for referencing the data item. The system identifiers allow for searching or accessing the corresponding data items. The arbitrary identifier assignor 220 can assign to each data item of the plurality of data items a corresponding arbitrary identifier that is different from the system identifier assigned to the same data item by the computer network 202. The arbitrary identifiers can be random numbers or random strings. For instance, the arbitrary identifier assignor 220 can include or have access to a random number generator, and use the random numbers generated by the random number generator as arbitrary identifiers of the data items.

The arbitrary identifier assignor 220 can assign arbitrary group identifiers to groups of related data items. A group of related data items can include a set of data items associated with a project, a set of data items associated with a customer, a set of data items associated with an asset of the computer environment, a set of data items associated with a category of assets of the computer environment or a combination thereof, among others. As such, an arbitrary group identifier can identify or reference a plurality of data items that are related to each other in some manner. In assigning arbitrary group identifiers to groups of data items, the arbitrary identifier assignor 220 can identify one or more groups of related data items, and assign to each group of related data items a corresponding arbitrary group identifier.

In some implementations, the arbitrary identifier assignor 220 can update the assigned arbitrary identifiers on a regular or irregular basis. For instance, the arbitrary identifier assignor 220 can periodically assign new arbitrary identifiers to the data items. The arbitrary identifier assignor 220 may replace previously assigned arbitrary identifiers with new arbitrary identifiers responsive to some specific events. By changing the arbitrary identifiers assigned to various data items over time makes the use of the arbitrary identifiers more reliable. In other words, even if a hacker was to determine the mapping between some data items and the corresponding arbitrary identifiers, such mapping would be temporary and would become useless once the arbitrary identifier assignor 220 assigns new arbitrary identifiers to the data items.

The mapping handler 222 can generate a mapping or an association between each arbitrary identifier assigned to a corresponding data item and the system identifier assigned to the same data item. For instance, the mapping handler 222 can generate and maintain one or more data structures that associate, for each data item, the corresponding system identifier with the corresponding arbitrary identifier. The one or more data structures can include one or more tables, one or more arrays, one or more linked lists or a combination thereof, among others. The mapping handler 222 can also generate and/or maintain a mapping between the arbitrary group identifiers and corresponding groups of related data items. In some implementations, if the computer network 202 assigns system group identifiers to the groups of related data items, the mapping handler 222 can map each arbitrary group identifier to the corresponding system group identifier. In some implementations, the mapping handler 222 can map for each group of related data items the corresponding arbitrary group identifier to system identifiers and/or arbitrary identifiers (e.g., arbitrary item identifiers) of the data items of the group of related data items.

Table 1 below illustrates an example mapping or association between arbitrary group identifiers and system identifiers of data items and/or corresponding arbitrary item identifiers. Each system identifier is mapped to a corresponding arbitrary item identifier. The arbitrary group identifier "arbitrary group ID1" is mapped to the system identifiers "system ID1", "system ID2" and "system ID3" to indicate that the data items associated with these system identifiers form a first group of related data items. Also, the arbitrary group identifier "arbitrary group ID2" is mapped to the system identifiers "system ID5" and "system ID6" to indicate that the data items associated with these system identifiers form a second group of related data items.

TABLE 1

| System IDs | Arbitrary Item IDs | Arbitrary Group IDs |
| --- | --- | --- |
| system ID1 | arbitrary ID1 | arbitrary group ID1 |
| system ID2 | arbitrary ID2 | |
| system ID3 | arbitrary ID3 | |
| system ID4 | arbitrary ID4 | |
| system ID5 | arbitrary ID5 | arbitrary group ID2 |
| system ID6 | arbitrary ID6 | |
| system ID7 | arbitrary ID7 | |

The mapping handler 222 can update the mapping or the association between the system identifiers and the arbitrary identifiers each time the arbitrary identifier assignor 220 updates the arbitrary identifiers assigned to the plurality of data items. In some implementations, the arbitrary identifier assignor 220 can generate and/or update the mapping or association between the system identifiers and the arbitrary identifiers. The data items having the system identifiers "system ID4" and "system ID7" do not belong to any group of related data items.

The mapping handler 222 can use the mapping or association between the system identifiers and the arbitrary identifiers to determine the arbitrary identifiers of various data items. For instance, before transmitting the content of a data item to a client device 206, the mapping handler 222 can determine the arbitrary identifier assigned to the data item using the system identifier and the mapping or association between the system identifiers and the arbitrary identifiers. The data abstraction system 204 can transmit the determined arbitrary identifier with the content of the data item. The determined arbitrary identifier can replace the system identifier and/or other context of the data item in the data transmitted to the client device 206.

The communication component 224 can be configured to handle communications between the computer network 202, or computing devices thereof, and the client devices 206. The communication component 224 can be configured to receive or intercept data requests from client devices 206 and/or transmit or cause transmission of data to the client devices 206. The communication component 224 can identify content or information associated with a data item or a group of related data items for transmitting to a client device 206. The communication component 224 may identify the data item(s) based on a request received from the client device 206, an application or software running on the computer network 202 or a combination of both. The communication component 224 can receive one or more system identifiers of one or more data items, and access the data item(s) to retrieve respective content for transmission to the client device 206.

The communication component 224 can receiver, from the mapping handler 222, one or more arbitrary identifier(s) corresponding to one or more data items and/or one or more groups of data items with content to be transmitted to the client device 206. The mapping handler 222 can identify or determine the one or more arbitrary identifier(s) using the generated mapping or an association and system identifiers or other indications of data items or groups of data items requested by the client device 206.

The computing devices of the computer network 202, the client devices 206 and the computing devices of the data abstraction system 204 can be similar in structure to the computing device 100 described above with regard to FIGS. 1C and 1D. That is, each of these computing devices can include a memory, such as the main memory 122 and/or the storage device 128, to store executable instructions, and one or more processors such as the main processor 121 configured to execute the instructions to perform processes or functions implemented into executable instructions. For instance, the data abstraction system 204 can include a memory to store executable instructions for performing methods described herein, and one or more processors to execute the instructions.

Figure 3:
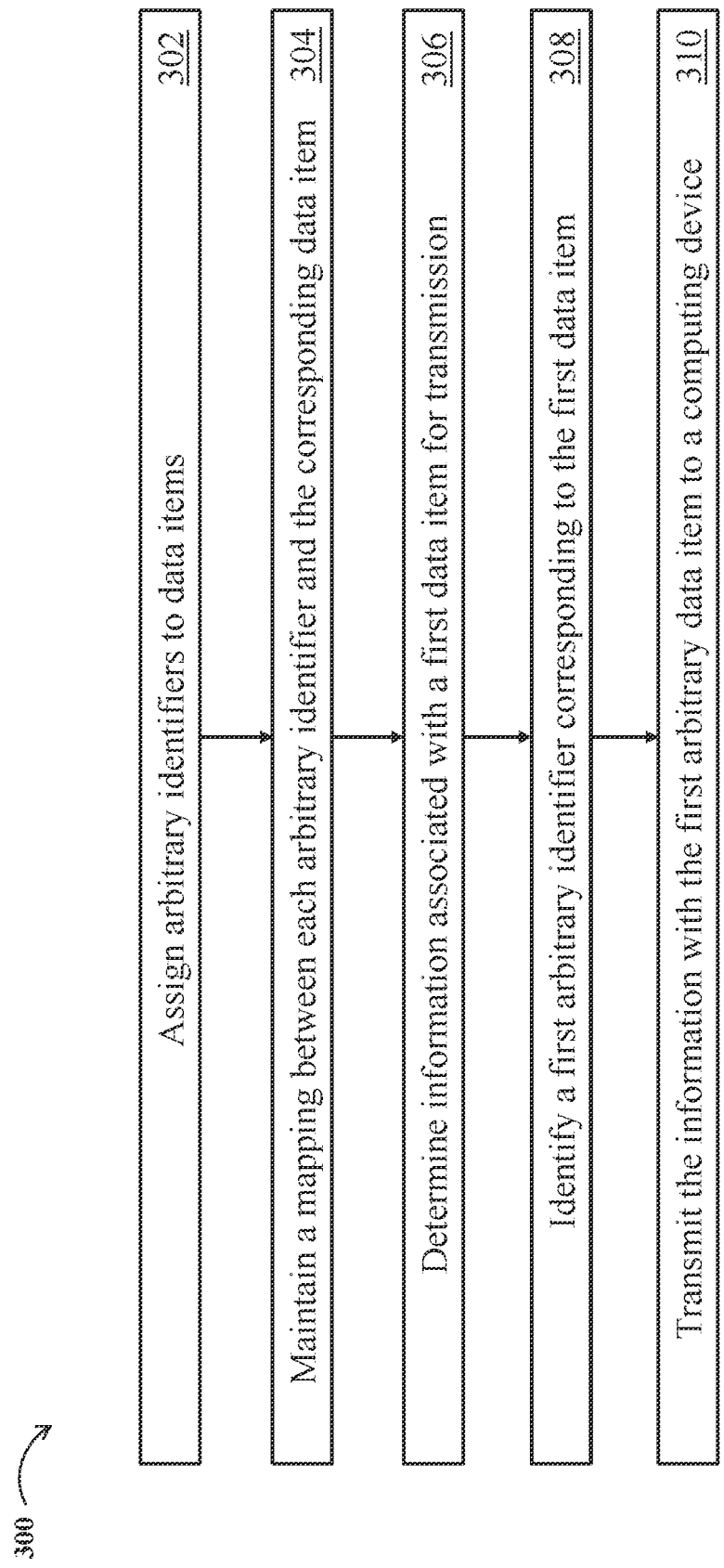
FIG. 3 shows a flowchart illustrating a method for applying data abstraction to data for transmission is shown, according to example embodiments.

Referring now to FIG. 3, a flowchart illustrating a method 300 for applying data abstraction to data for transmission is shown, according to example embodiments. In brief overview, the method 300 can include assigning arbitrary identifiers to data items (STEP 302), and maintaining a mapping between each arbitrary identifier and the corresponding data item (STEP 304). The method 300 can include determining information associated with a first data item for transmission (STEP 306), and identifying a first arbitrary identifier corresponding to the first data item (STEP 308). The method 300 can include transmitting or causing transmission of the information with the first arbitrary identifier to a computing device (STEP 310). The method 300 can be implemented as software, firmware and/or hardware. The method 300 can be performed by the data abstraction system 204 or one or more devices thereof, such as computing device 100.

The method 300 can include the data abstraction system 204 assigning arbitrary identifiers to data items (STEP 302). As discussed above with regard to FIG. 2, the data abstraction system 204 or the respective processor(s), e.g., processor 121 of FIGS. 1C and 1D, can assign to each data item of a plurality of data items a corresponding arbitrary item identifier. For each data item, the corresponding arbitrary item identifier can be different from the system identifier assigned to the same data item. The processor(s) can determine the arbitrary item identifiers using, for example, a random number generator or a random string generator.

The processor(s) can assign arbitrary group identifiers to groups of related data items. A group of related data items can include a set of data items associated with a project, a set of data items associated with a customer, a set of data items associated with an asset of the computer environment, a set of data items associated with a category of assets of the computer environment or a combination thereof, among others. The arbitrary group identifier can identify or reference a plurality of data items that related to each other in manner. In assigning arbitrary group identifiers to groups of data items, the processor(s) can identify one or more groups of related data items, and assign to each group of related data items a corresponding arbitrary group identifier. The processor(s) can update the arbitrary item identifiers and/or the arbitrary group identifiers on a regular or irregular basis. The processor(s) may replace previously assigned arbitrary item identifiers and arbitrary group identifiers with new arbitrary item identifiers and new arbitrary group identifiers, respectively.

The method 300 can include the data abstraction system 204 maintaining a mapping between each data item of the plurality of data items and the corresponding arbitrary identifier (STEP 304). As discussed above with regard to the mapping handler 222 in relation with FIG. 2, the processor(s) of the data abstraction system 204 can generate and maintain a data structure that maps or associates, for each data item, the corresponding arbitrary item identifier to the system identifier of the same data item. The processor(s) can also map each arbitrary group identifier to system identifiers (or corresponding arbitrary item identifiers) of data items of the group of related data items, for example, as illustrated above in Table 1.

The method 300 can include the data abstraction system 204 determining information associated with a first data item of the plurality of data items for transmission to a client device 206 (STEP 306). For instance, the processor(s) of the data abstraction system 204 can receive or access a request for information or data associated with the first data item from the client device 206, and determine the information or data associated with the first data item responsive to the request. The request can be a request for data or information associated one or more data items or a group of data items. The processor(s) can identify the data items whose content to be transmitted to the client device 206, and then retrieve the respective content or information for transmission to the client device 206. In some implementations, the processor(s) can receive system identifiers of data items whose content is to be transmitted from an application running on or a system of the computer network 202. The information or data determined to be transmitted can include values (e.g., parameter values) or attributes of corresponding data items (e.g., a color associated with graphical object, a layout of a user interface (UI), formatting settings of a document, file name(s), etc.).

The method 300 can include the data abstraction system 204 identifying a first arbitrary identifier assigned to the first data item (STEP 308). The processor(s) of the data abstraction system 204 can use the system identifier of the first data item and the mapping between system identifiers of data items and the corresponding arbitrary item identifiers to determine the arbitrary item identifier of the first data item. In the case where the data to be transmitted relates to a group of related data items, the processor(s) can use the system identifiers of the data items of the group and the mapping to identify the arbitrary group identifier of the group and/or the arbitrary item identifiers of the data items in the group.

The method 300 can include the data abstraction system 204 transmitting the information with the first arbitrary identifier to the client device 206 (STEP 310). The processor(s) can generate a message including the information to be transmitted (e.g., values and or attributes), and transmit (or cause transmission of) the message to the client device. The message can include the first arbitrary identifier together with the information to be transmitted (e.g., values and or attributes). The processor(s) can transmit the first arbitrary identifier in or with the message. The information or data can include data retrieved from a plurality of data items (e.g., belonging to a group of related data items).

In some implementations, the plurality of data items can be associated with a workspace accessed by the client device 206. The client device 206 can create a workspace. The computer network 202 or a system thereof can generate a workspace database that is accessible by the client device 206. The data abstraction system 204 can apply the method 300 to data items in the workspace database. In particular, the data abstraction system 204 can assign arbitrary identifiers to data items of the workspace and transmit information or data of one or more data items together with corresponding arbitrary identifiers to the client device 206. The workspace can be associated, for example, with a project, a geolocation, a group of assets (e.g., computing devices, network devices, other electrical or electronic devices, software modules or components or a combination thereof), a solution stack or other subsystem of the computer network 202, a client or customer associated with the computer network 202 or a combination thereof, among others.

The client device 206 can receive data content (e.g., values or attributes of parameters, graphical objects, user interfaces(s), data files, etc.) associated with the data items or groups of data items together with the corresponding arbitrary identifiers (e.g., arbitrary identifiers of the data items or groups of data items). The arbitrary identifiers can be the only identifiers provided to the client device 206 to identify the data content, the data items and/or the groups of data items. Since the identifiers are arbitrary, they do not provide any contextual information of the data content received by the client device 206. In some implementations, the mapping or association between the arbitrary identifiers and the corresponding data items or groups of data items may not be provided to the client device 206. For example, if the client device 206 is requesting or accessing data of assets of the computer network 202, the client device 206 or a user thereof will recognize that different pieces of the received data correspond to different assets but will not know the actual identity or attributes (e.g., IP address, name or description) of the assets. The client device 206 or the corresponding user will recognize separate assets based on different received arbitrary identifiers only. In other words, the client device 206 or the user will only know which piece(s) of data corresponds to which arbitrary identifier (in this case representing an arbitrary identifier of the asset), but will not receive any additional information identifying or describing the assets.

In some implementations, the data abstraction system 204 can initially (e.g., at the beginning of a workspace access session or other data access session) send the generated mapping between the arbitrary identifiers and system identifiers to the client device 206. The client device can store the mapping and use later when data content is received with the arbitrary identifiers to determine the identity of data items, groups of data items and/or any entities associated therewith.

A group of data items can include at least one of a set of data items associated with a project, a set of data items associated with a customer or client associated with the computer network 202, a set of data items associated with an asset of the computer network 202, or a set of data items associated with a category of assets of the computer network 202. The data items can include at least one of a data file, a data parameter, a graphical object, a table, a data structure, an asset setting parameter, an asset performance parameter, a parameter associated with some variable or a combination thereof, among others. In some implementations, the plurality of data items can be associated with a workspace accessed by the computing device.

In some implementations, the one or more processors can update the arbitrary identifiers assigned to the plurality of data items and/or the groups of data items on a regular basis to further reduce or eliminate any chance of the mapping being revealed (e.g., to intruders or hackers). For instance, the identifier assignor 220 can regenerate new identifiers for the data items and/or groups of data items periodically (e.g., every day, every hour, etc.), and pass the new identifiers to the mapping handler to update the mapping based on the new identifiers.

The method 300 can be implemented as executable instructions. A computer-readable medium can store the executable instructions. One or more processors, such as processor 121, can execute the instructions stored in the computer-readable medium. When executed, the instructions can cause the one or more processors to perform the method 300 or steps thereof.

While the disclosure has been particularly shown and described with reference to specific embodiments, it should be understood by those skilled in the art that various changes in form and detail may be made therein without departing from the spirit and scope of the invention described in this disclosure.

While this disclosure contains many specific embodiment details, these should not be construed as limitations on the scope of any inventions or of what may be claimed, but rather as descriptions of features specific to particular embodiments of particular inventions. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

The invention claimed is:

1. A system comprising:
one or more processors; and
a memory storing computer executable instructions, the computer executable instructions, when executed by the one or more processors, cause the one or more processors to:
assign to each data item of a plurality of data items a corresponding arbitrary identifier, the corresponding arbitrary identifier different from a system identifier assigned to the data item by a computer network maintaining the data item, the corresponding arbitrary identifier comprising a random number changed for each data item over time;
maintain a mapping between each data item of the plurality of data items and the corresponding arbitrary identifier and corresponding system identifier;
receive a request for a first data item of the plurality of data items, the request identifying a first arbitrary identifier assigned to the first data item;
determine an attribute or value of the first data item of the plurality of data items for transmission to a computing device by using the mapping of the first arbitrary identifier to the first data item; and
transmit, responsive to the request for the first data item, the attribute or the value of the first data item and the first arbitrary identifier to the computing device without identifying the first data item.

2. The system of claim 1, wherein in maintaining the mapping between each data item of the plurality of data items and the corresponding arbitrary identifier the one or more processors are configured to map the corresponding arbitrary identifier to the system identifier of the data item.

3. The system of claim 1, wherein the one or more processors are further configured to:
identify a group of related data items;
assign an arbitrary group identifier to the group of related data items; and
maintain a mapping between the arbitrary group identifier and the group of related data items.

4. The system of claim 3, wherein the one or more processors are further configured to map the arbitrary group identifier to arbitrary identifiers of data items in the group of related data items.

5. The system of claim 3, wherein the one or more processors are further configured to:
determine second information associated with the group of data items for transmission to the computing device;
identify, using the mapping, a first arbitrary group identifier assigned to the group of related data items; and
transmit the second information with the first arbitrary group identifier to the computing device.

6. The system of claim 3, wherein the group of related data items includes at least one of:
a set of data items associated with a project;
a set of data items associated with a customer;
a set of data items associated with an asset of the computer network; or
a set of data items associated with a category of assets of the computer network.

7. The system of claim 1, wherein the plurality of data items include at least one of:
a data file;
a data parameter;
a graphical object;
a table; or
a data structure.

8. The system of claim 1, wherein the plurality of data items are associated with a workspace accessed by the computing device.

9. The system of claim 1, wherein the value or attribute comprises a color associated with a graphical object, a layout of a user interface, formatting setting of a document.

10. The system of claim 1, wherein the one or more processors are further configured to change the arbitrary identifiers assigned to the plurality of data items on a regular basis.

11. A method comprising:
assigning, by one or more processors, to each data item of a plurality of data items a corresponding arbitrary identifier, the corresponding arbitrary identifier different from a system identifier assigned to the data item by a computer network maintaining the data item, the corresponding arbitrary identifier comprising a random number changed for each data item over time;

maintaining, by the one or more processors, a mapping between each data item of the plurality of data items and the corresponding arbitrary identifier and corresponding system identifier receiving, by the one or more processors, a request for a first data item of the plurality of data items, the request identifying a first arbitrary identifier assigned to the first data item;

determining, by the one or more processors, an attribute or value of the first data item of the plurality of data items for transmission to a computing device by using the mapping of the first arbitrary identifier to the first data item; and transmitting, by the one or more processors responsive to the request for the first data item, the attribute or the value of the first data item and the first arbitrary identifier to the computing device without identifying the first data item.

12. The method of claim 11, wherein maintaining the mapping between each data item of the plurality of data items and the corresponding arbitrary identifier includes mapping the corresponding arbitrary identifier to the system identifier of the data item.

13. The method of claim 11, further comprising:

identifying a group of related data items;

assigning an arbitrary group identifier to the group of related data items; and maintaining a mapping between the arbitrary group identifier and the group of related data items.

14. The method of claim 13, further comprising mapping the arbitrary group identifier to arbitrary identifiers of data items in the group of related data items.

15. The method of claim 13, further comprising:

determining second information associated with the group of data items for transmission to the computing device;

identifying, using the mapping, a first arbitrary group identifier assigned to the group of related data items; and transmitting the second information with the first arbitrary group identifier to the computing device.

16. The method of claim 13, wherein the group of related data items includes at least one of:
 a set of data items associated with a project;
 a set of data items associated with a customer;
 a set of data items associated with an asset of the computer network; or
 a set of data items associated with a category of assets of the computer network.

17. The method of claim 11, wherein the plurality of data items include at least one of:
 a data file;
 a data parameter;
 a graphical object;
 a table; or
 a data structure.

18. The method of claim 11, wherein the plurality of data items are associated with a workspace accessed by the computing device.

19. The method of claim 11, further comprising changing the arbitrary identifiers assigned to the plurality of data items on a regular basis.

20. A non-transitory computer-readable medium storing computer executable instructions, the computer executable instructions when executed by one or more processors cause the one or more processors to:

assign to each data item of a plurality of data items a corresponding arbitrary identifier, the corresponding arbitrary identifier different from a system identifier assigned to the data item by a computer network maintaining the data item, the corresponding arbitrary identifier comprising a random number changed for each data item over time;

maintain a mapping between each data item of the plurality of data items and the corresponding arbitrary identifier and corresponding system identifier;

receive a request for a first data item of the plurality of data items, the request identifying a first arbitrary identifier assigned to the first data item;

determine an attribute or value of the first data item of the plurality of data items for transmission to a computing device by using the mapping of the first arbitrary identifier to the first data item; and transmit, responsive to the request for the first data item, the attribute or the value of the first data item and the first arbitrary identifier to the computing device without identifying the first data item.

\* \* \* \* \*